US008949566B2

(12) United States Patent
Kandasamy et al.

(10) Patent No.: US 8,949,566 B2
(45) Date of Patent: Feb. 3, 2015

(54) LOCKING ACCESS TO DATA STORAGE SHARED BY A PLURALITY OF COMPUTE NODES

(75) Inventors: Madhusudanan Kandasamy, Gobichettipalayam (IN); Vidya Ranganathan, Bangalore (IN); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 12/958,891

(22) Filed: Dec. 2, 2010

(65) Prior Publication Data

US 2012/0144138 A1    Jun. 7, 2012

(51) Int. Cl.
| G06F 12/14 | (2006.01) |
| G06F 9/52 | (2006.01) |
| G06F 17/30 | (2006.01) |
| G06F 9/45 | (2006.01) |
| G06F 9/54 | (2006.01) |

(52) U.S. Cl.
CPC ...... *G06F 9/526* (2013.01); *G06F 9/52* (2013.01); *G06F 17/30171* (2013.01); *G06F 8/458* (2013.01); *G06F 9/546* (2013.01); *G06F 9/524* (2013.01)
USPC ........... 711/163; 711/154; 711/156; 711/158; 710/200; 709/226

(58) Field of Classification Search
USPC .................. 711/154, 156, 158, 163; 710/200; 709/226
See application file for complete search history.

(56) References Cited

U.S. PATENT DOCUMENTS

| 5,922,057 | A  * | 7/1999 | Holt ................................ 710/52 |
| 6,523,066 | B1 * | 2/2003 | Montroy et al. .............. 709/229 |
| 6,938,084 | B2 | 8/2005 | Gamache et al. |
| 7,150,019 | B1 * | 12/2006 | Simmons et al. ............. 718/104 |
| 8,145,817 | B2 * | 3/2012 | Detlefs ......................... 710/200 |
| 8,504,540 | B2 * | 8/2013 | Olszewski et al. ............ 707/704 |
| 2005/0220112 | A1 * | 10/2005 | Williams et al. .............. 370/394 |
| 2006/0224805 | A1 * | 10/2006 | Pruscino et al. .............. 710/200 |
| 2007/0067774 | A1 * | 3/2007 | Kukanov et al. .............. 718/102 |
| 2008/0244613 | A1 | 10/2008 | Parthasarathy et al. |
| 2009/0070623 | A1 | 3/2009 | Sciacca |
| 2010/0275209 | A1 * | 10/2010 | Detlefs ......................... 718/102 |
| 2012/0089735 | A1 * | 4/2012 | Attaluri et al. ................ 709/226 |

\* cited by examiner

*Primary Examiner* — Arpan P. Savla
(74) *Attorney, Agent, or Firm* — Edward J. Lenart; Mark McBurney; Biggers Kennedy Lenart Spraggins LLP

(57) ABSTRACT

Methods, apparatuses, and computer program products are provided for locking access to data storage shared by a plurality of compute nodes. Embodiments include maintaining, by a compute node, a queue of requests from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying, based on the order of requests in the queue, possession of the queue from the compute node to a next requesting compute node when the compute node no longer requires exclusive access to the data storage.

20 Claims, 9 Drawing Sheets

LOCKING ACCESS TO DATA STORAGE SHARED BY A PLURALITY OF COMPUTE NODES

BACKGROUND OF THE INVENTION

1. Field of the Invention

The field of the invention is data processing, or, more specifically, methods, apparatuses, and products for locking access to data storage shared by a plurality of compute nodes.

2. Description of Related Art

In a distributed system, multiple autonomous computer nodes communicate and interact with each in order to achieve a common goal. The compute nodes may execute code that uses common resources of the distributed system. Examples of such resources are global variables, fine-grained flags, counters, or queues, used to communicate between pieces of code that run concurrently on the different compute nodes. To avoid resources being used simultaneously by multiple compute nodes, access to the resources may be controlled such that exclusive permission is given to only one compute node at a time.

SUMMARY OF THE INVENTION

Methods, apparatuses, and products are provided for locking access to data storage shared by a plurality of compute nodes. Embodiments include maintaining, by a compute node, a queue of requests from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying, based on the order of requests in the queue, possession of the queue from the compute node to a next requesting compute node when the compute node no longer requires exclusive access to the data storage.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
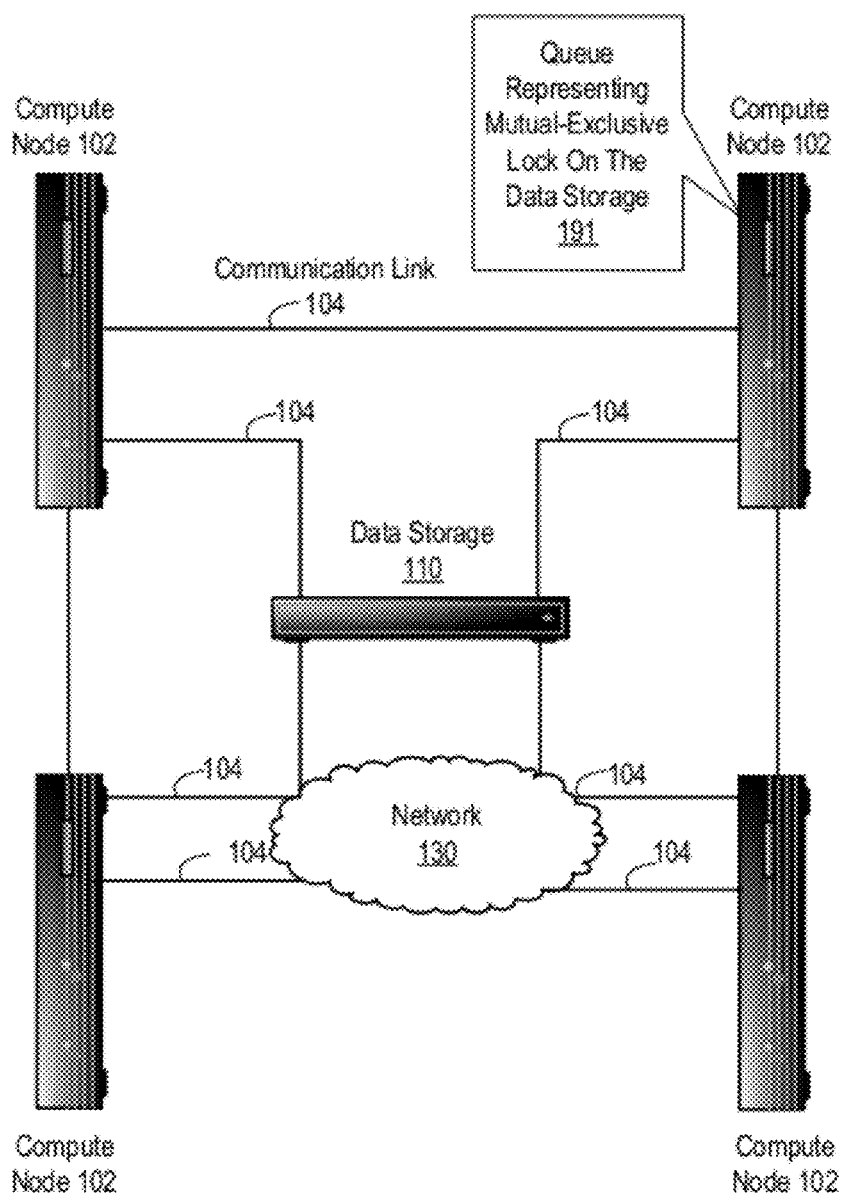
FIG. 1 sets forth a network diagram of a system for locking access to data storage shared by a plurality of compute nodes according to embodiments of the present invention.

Examples of methods, apparatuses, and computer program products for locking access to data storage shared by a plurality of compute nodes in accordance with the present invention are described with reference to the accompanying drawings, beginning with FIG. 1. FIG. 1 sets forth a network diagram of a system for locking access to data storage shared by a plurality of compute nodes according to embodiments of the present invention. The system of FIG. 1 is a distributed system that includes a plurality of compute nodes (102) coupled together by communication pathways (104). The communication pathways (104) of FIG. 1 may include wireless connections and wired connections, such as Ethernet. The compute nodes (102) of FIG. 1 may be connected together directly or through a network (100).

The compute nodes (102) of FIG. 1 may share resources of the distributed system. Data storage (110) of FIG. 1 is an example of a resource that may be shared among the compute nodes (102). The data storage (110) of FIG. 1 may include global variables, fine-grained flags, counters, or queues that are used by multiple compute nodes during the execution of processes or threads. Simultaneous usage of the data storage (110) by multiple compute nodes could result unpredictable and inconsistent values in the data storage (110). To prevent simultaneous usage of the data storage (110), the compute nodes (102) of FIG. 1 are configured to communicate with each other to establish which compute node (102) is to be given exclusive permission to access the data storage (110). When a compute node (102) is given exclusive permission to access the data storage (110), the data storage (110) is said to be locked or that a compute node (102) has acquired a mutual-exclusion lock on the data storage (110). The mutual-exclusion lock indicates exclusive permission for access to the data storage (110).

If a particular compute node (102) requires exclusive use of the data storage (110), the compute node (102) may check a shared location in the distributed system. The shared location is accessible to all of the compute nodes (102) and indicates if the data storage (110) is locked. For example, the shared location may include a lock status table. If, according to the shared location, the data storage (110) is not locked, the particular compute node (102) may acquire the lock on the data storage (110). To acquire the lock, the compute node (102) may update a lock status within the shared location. For example, the compute node (102) may change the status within the shared location from unlocked to locked.

If, according to the shared location, the data storage (110) is locked, the particular compute node (110) may communicate with the other compute nodes (102) to determine which compute node (102) has the lock on the data storage (110). For example, the particular compute node (102) of FIG. 1 is configured to transmit to each of the compute nodes (102), a request for access to the data storage (110). If a compute node (102) receives a request for access and the receiving compute node does not have the lock on the data storage (110), the receiving compute node (102) is configured to not send an acknowledgment message to the particular compute node (102) that transmitted the request. If the receiving compute node (102) does have the lock on the data storage (110), the receiving compute node (102) of FIG. 1 is configured to maintain a queue (191) of the requests from requesting compute nodes. The queue (191) indicates the order in which requests for access to the data storage (110) are received by the compute node (102) that has the lock on the data storage (110). Possession of the queue (191) represents possession of the mutual-exclusion lock on the data storage (110). The queue (191) of FIG. 1 may be an electronic linked list of identifiers, each of which indicates a compute node (102) that has transmitted a request for access to the data storage (110).

After the compute node (102) with the mutual-exclusion lock no longer requires exclusive access to the data storage (110), the compute node (102) is configured to convey the queue (191), based on the order of requests in the queue, possession of the queue (191) to a next requesting compute node (102). Conveying may include propagating the queue to the next requesting compute node (102). The next compute node (102) may correspond with the oldest entry in the queue (191). In response to receiving the queue (191), the next requesting compute node (102) may update the shared location to indicate that a new compute node has the mutual-exclusion lock on the data storage (110).

In addition to maintaining the queue (191), the receiving compute node (102) with the lock may be also configured to transmit an acknowledgement to the particular compute node (102) that transmitted the request. In contrast to a system where compute nodes that do not have the lock, send messages in response to a received request, the system of FIG. 1 has a reduced number of messages, thus reducing bandwidth constraints on the system.

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Locking access to data storage shared by a plurality of compute nodes in accordance with the present invention is generally implemented with computers, that is, with automated computing machinery. In the system of FIG. 1, for example, all the compute nodes (102) and the data storage (110) are implemented to some extent at least as computers. For further explanation, therefore, FIG. 2 sets forth a block diagram of automated computing machinery comprising an example compute node (152) useful in locking access to data storage shared by a plurality of compute nodes according to embodiments of the present invention. The compute node (152) of FIG. 2 includes at least one computer processor (156) or 'CPU' as well as random access memory (168) ('RAM') which is connected through a high speed memory bus (166) and bus adapter (158) to processor (156) and to other components of the compute node (152).

Stored in RAM (168) is a lock manager (159) that includes computer program instructions for locking access to data storage shared by a plurality of compute nodes in accordance with the present invention. The computer program instructions in the lock manager (159) that when executed by the computer processor (156), cause the computer processor (156) to carry out the steps of maintaining, by the compute node (152), a queue (191) of requests from requesting compute nodes of a plurality of compute nodes (102) for access to the data storage (110), wherein possession of the queue (191) represents possession of a mutual-exclusion lock on the data storage (110), the mutual-exclusion lock indicating exclusive permission for access to the data storage (110); and conveying, based on the order of requests in the queue (191), possession of the queue (191) from the compute node (152) to a next requesting compute node (102) when the compute node (152) no longer requires exclusive access to the data storage (110).

Also stored in RAM (168) is an operating system (154). Operating systems useful for locking access to data storage shared by a plurality of compute nodes according to embodiments of the present invention include UNIX™, Linux™, Microsoft XP™, AIX™, IBM's i5/OS™, and others as will occur to those of skill in the art. The operating system (154), the queue (191), and the lock manager (159) in the example of FIG. 2 are shown in RAM (168), but many components of such software typically are stored in non-volatile memory also, such as, for example, on a disk drive (110).

Figure 2:
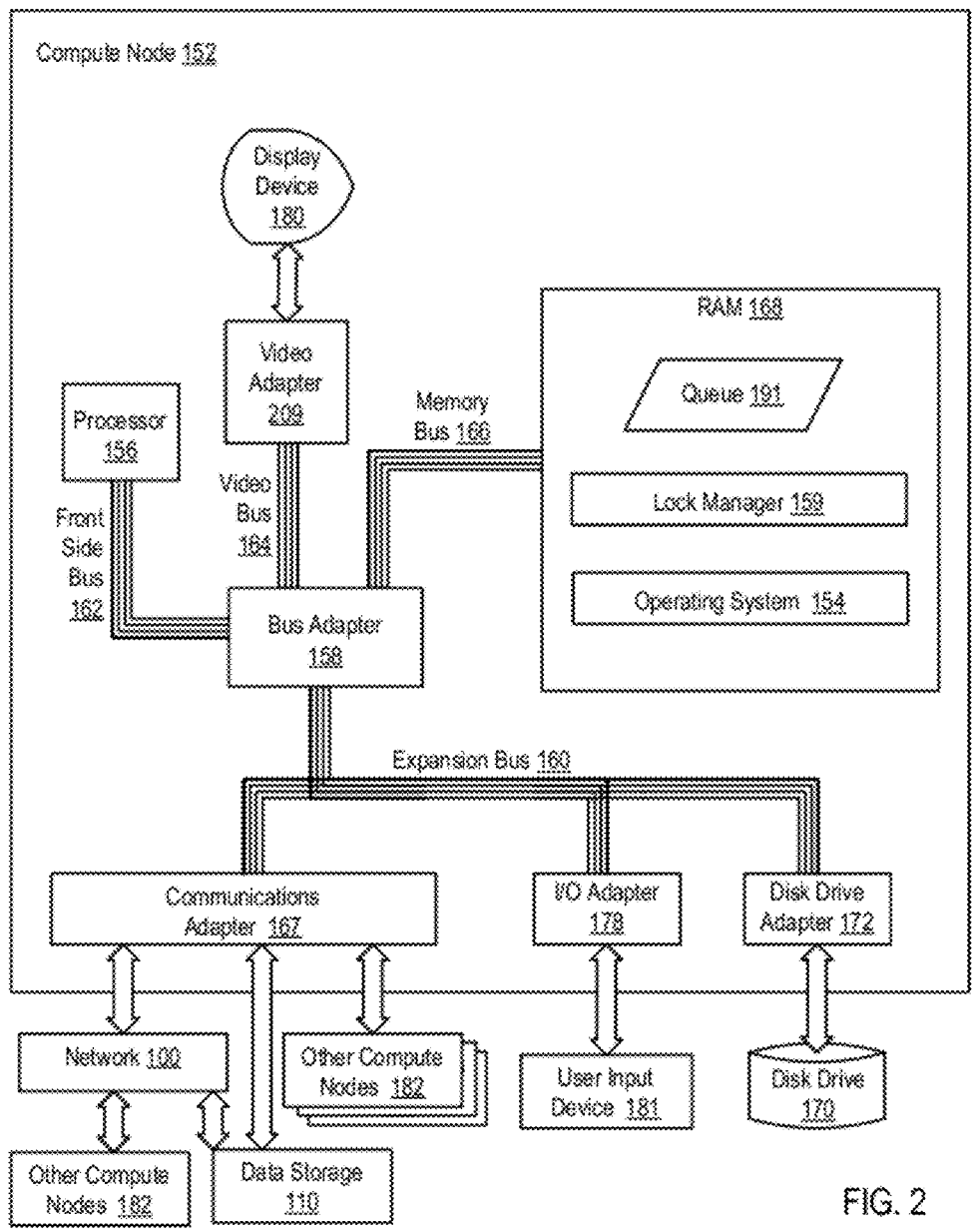
FIG. 2 sets forth a block diagram of automated computing machinery comprising an example computer useful in locking access to data storage shared by a plurality of compute nodes according to embodiments of the present invention.

The compute node (152) of FIG. 2 includes disk drive adapter (172) coupled through expansion bus (160) and bus adapter (158) to processor (156) and other components of the compute node (152). The disk drive adapter (172) connects non-volatile data storage to the compute node (152) in the form of the disk drive (170). Disk drive adapters useful in computers for locking access to data storage shared by a plurality of compute nodes according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example compute node (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example compute node (152) of FIG. 2 includes a video adapter (209), which is an example of an I/O adapter specially designed for graphic output to a display device (180) such as a display screen or computer monitor. Video adapter (209) is connected to the processor (156) through a high speed video bus (164), bus adapter (158), and the front side bus (162), which is also a high speed bus.

The example compute node (152) of FIG. 2 includes a communications adapter (167) for data communications with other compute nodes (102), data storage (110), and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for locking access to data storage shared by a plurality of compute nodes according to embodiments of the present invention include modems for wired dial-up communications, Ethernet (IEEE 802.3) adapters for wired data communications network communications, and 802.11 adapters for wireless data communications network communications.

Figure 3:
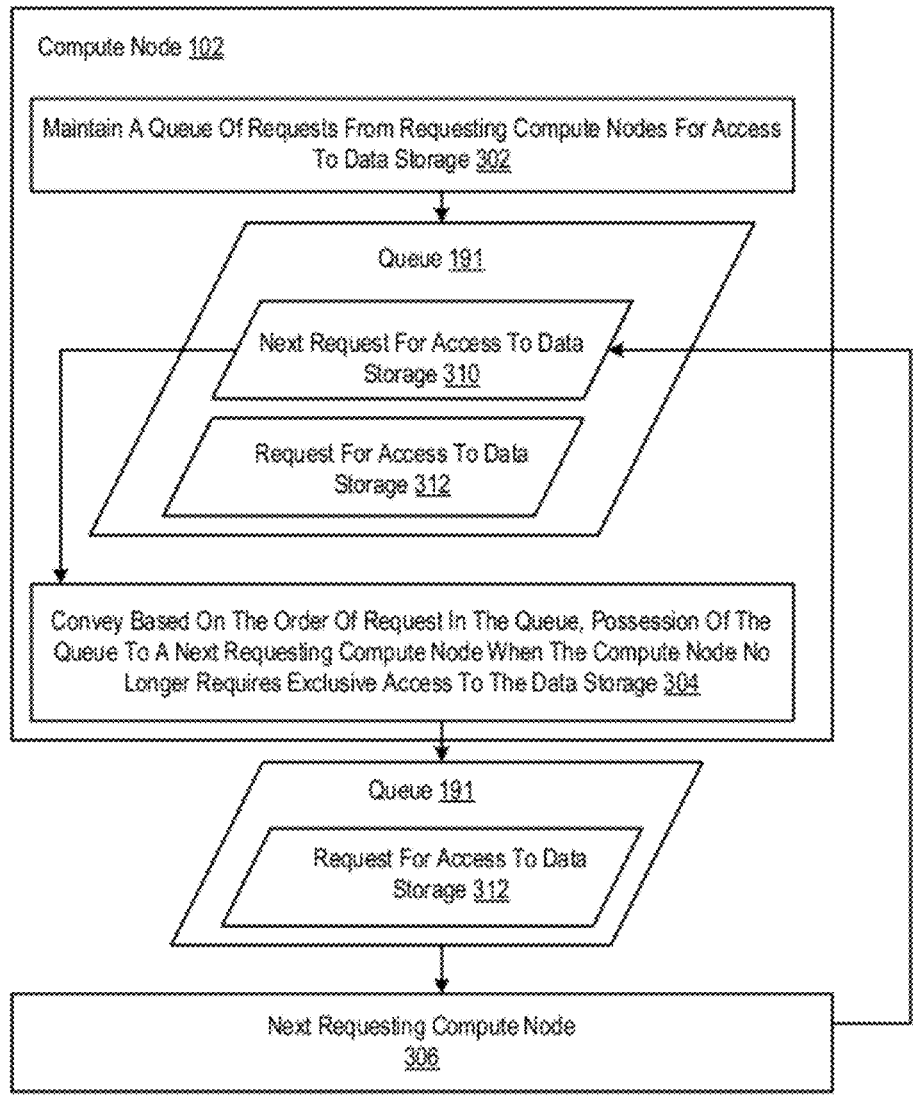
FIG. 3 sets forth a flow chart illustrating an example of a method for locking access to data storage shared by a plurality of compute nodes according to embodiments of the present invention.

For further explanation, FIG. 3 sets forth a flow chart illustrating an example method for locking access to data storage shared by a plurality of compute nodes according to embodiments of the present invention. The method of FIG. 3 includes maintaining (302), by a compute node (102), a queue (191) of requests (310, 312) from requesting compute nodes of the plurality of compute nodes for access to the data storage, wherein possession of the queue represents possession of a mutual-exclusion lock on the data storage, the mutual-exclusion lock indicating exclusive permission for access to the data storage. Maintaining (302) the queue (191) may be carried out by receiving requests for access to data storage; loading into the queue, identifiers of the compute node corresponding with a particular request; ordering the identifiers based on the order in which the requests are received; and removing a request in response to a mutual-exclusion lock on the data storage being released.

The method of FIG. 3 also includes conveying (304), based on the order of requests in the queue (191), possession of the queue (191) from the compute node (102) to a next requesting compute node (306) when the compute node (102) no longer requires exclusive access to the data storage. Conveying (304) the possession of the queue (191) may be carried out by determining the oldest identifier in the queue; based on the determined oldest identifier, identifying the next compute node (306) requesting exclusive permission to access the data storage; converting the information in the queue into a format for transmission to the next compute node (306); and transmitting the information in the queue to the next compute node (306).

Figure 4:
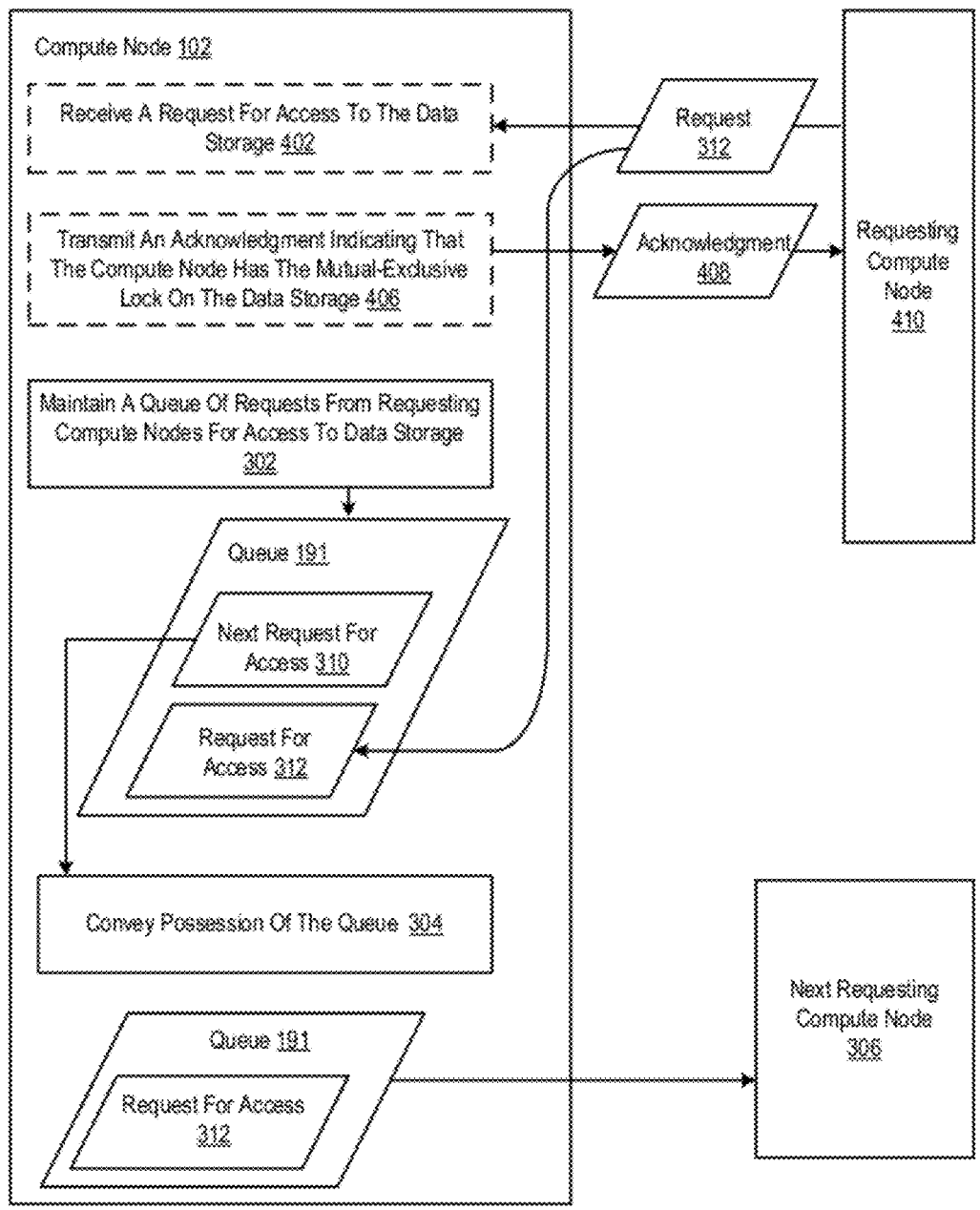
FIG. 4 sets forth a flow chart illustrating another example of a method for locking access to data storage shared by a plurality of compute nodes according to embodiments of the present invention.

For further explanation, FIG. 4 sets forth a flow chart illustrating a further example of a method for locking access to data storage shared by a plurality of compute nodes according to embodiments of the present invention. The method of FIG. 4 includes the following elements of the method of FIG. 3: maintaining (302), by a compute node (102), a queue (191) of requests (310, 312) from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying (304), based on the order of requests in the queue (191), possession of the queue (191) from the compute node (102) to a next requesting compute node (306) when the compute node (102) no longer requires exclusive access to the data storage.

The elements of FIG. 4 that differ from the method of FIG. 3 are illustrated in FIG. 4 with a dashed line. More particularly, those elements include: receiving (402), by the compute node (102) from a requesting compute node (410), a request (312) for access to the data storage; and in response to receiving the request (312) for access to the data storage, transmitting (406), by the compute node (102), an acknowledgment (408) indicating that the compute node (102) has the mutual-exclusion lock on the data storage.

The method of FIG. 4 includes receiving (402), by the compute node (102) from a requesting compute node (410), a request (312) for access to the data storage. Receiving (402) the request (312) for access to the data storage may be carried out by establishing communication with the requesting compute node (410) and storing the received request (312) in the compute node (102).

The method of FIG. 4 also includes in response to receiving the request (312) for access to the data storage, transmitting (406), by the compute node (102), an acknowledgment (408) indicating that the compute node (102) has the mutual-exclusion lock on the data storage. Transmitting (406) the acknowledgment (408) may be carried out by determining if the compute node (102) currently has the mutual-exclusion lock on the data storage and establishing communication with the requesting compute node (410).

Figure 5:
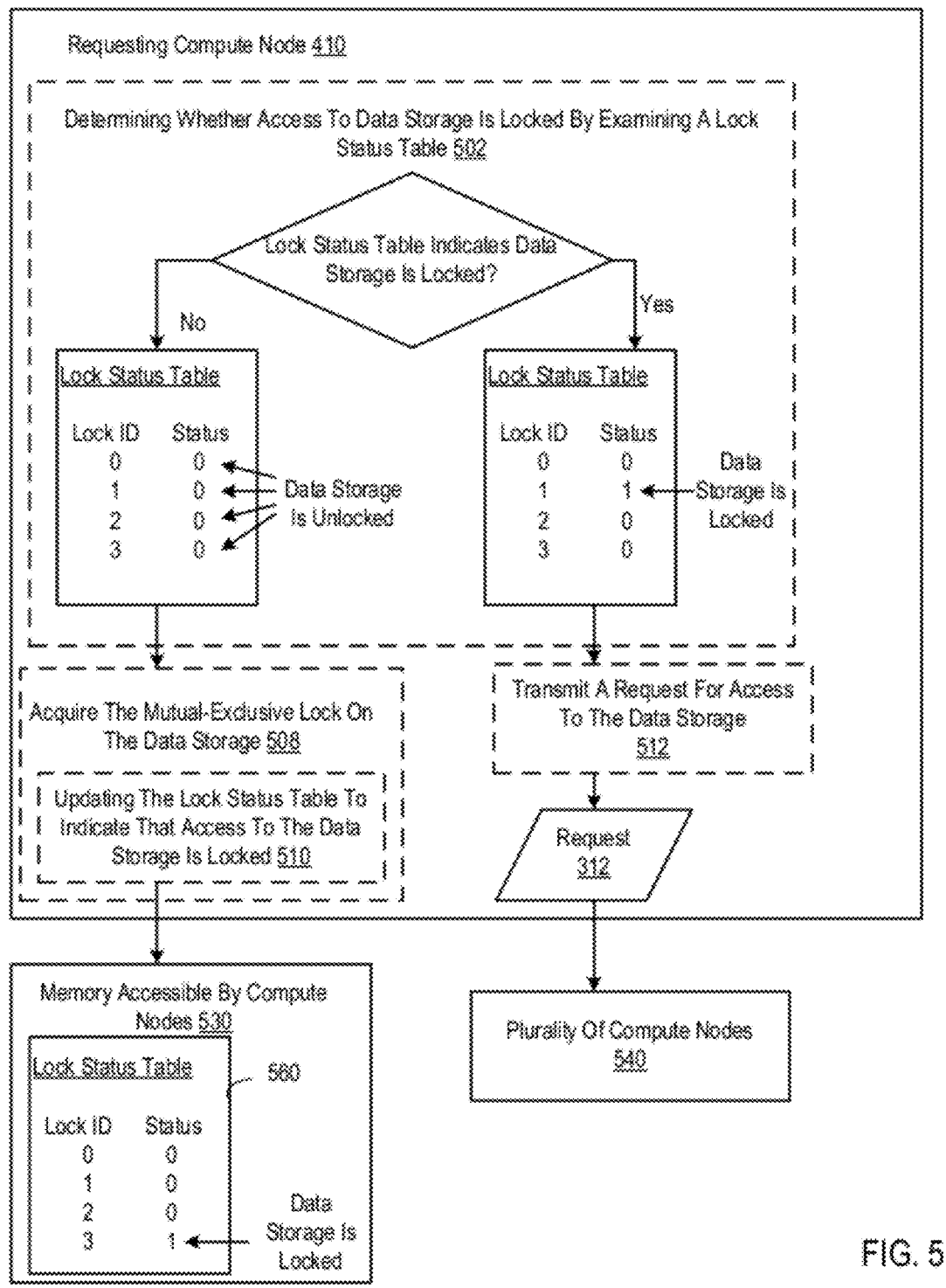
FIG. 5 sets forth a flow chart illustrating another example of a method for locking access to data storage shared by a plurality of compute nodes according to embodiments of the present invention.

For further explanation, FIG. 5 sets forth a flow chart illustrating a further example of a method for locking access to data storage shared by a plurality of compute nodes according to embodiments of the present invention. The method of FIG. 5 includes determining (502), by a requesting compute node (410), whether access to the data storage is locked by examining a lock status table (560) that is stored in memory (530) that is accessible by each of the nodes. This embodiment is useful when none of the compute nodes hold the lock to data storage. Determining (502) whether access to the data storage is locked may be carried out by establishing communication with the memory (530); reading information within the lock status table (560); and identifying an indicator in the lock status table (560) that indicates that the data storage is locked. The example lock status table (560) of FIG. 5 includes a "lock ID" parameter that corresponds with a compute node and a "Status" identifier that indicates if the compute node has a mutual-exclusion lock on the data storage.

The method of FIG. 5 includes in response to determining (502) that the data storage is not locked, acquiring (508), by the requesting compute node (410), the mutual-exclusion lock on the data storage by updating (510) the lock status table (560) to indicate that access to the data storage is locked. Updating (510) the lock status table (560) may be carried out by establishing communication with the memory (530); determining the parameter and identifier within the lock status table (560) that corresponds with the requesting compute node (410); and changing the value of the determined identifier.

The method of FIG. 5 includes in response to determining that the data storage is locked, transmitting (512) from the requesting compute node (410) to the plurality of compute nodes (540), a request (312) for access to the data storage. Transmitting the request (312) for access may be carried out by establishing communication with at least one of a plurality of compute nodes (540) and broadcasting the request (310) to the plurality of compute nodes (540).

Figure 6:
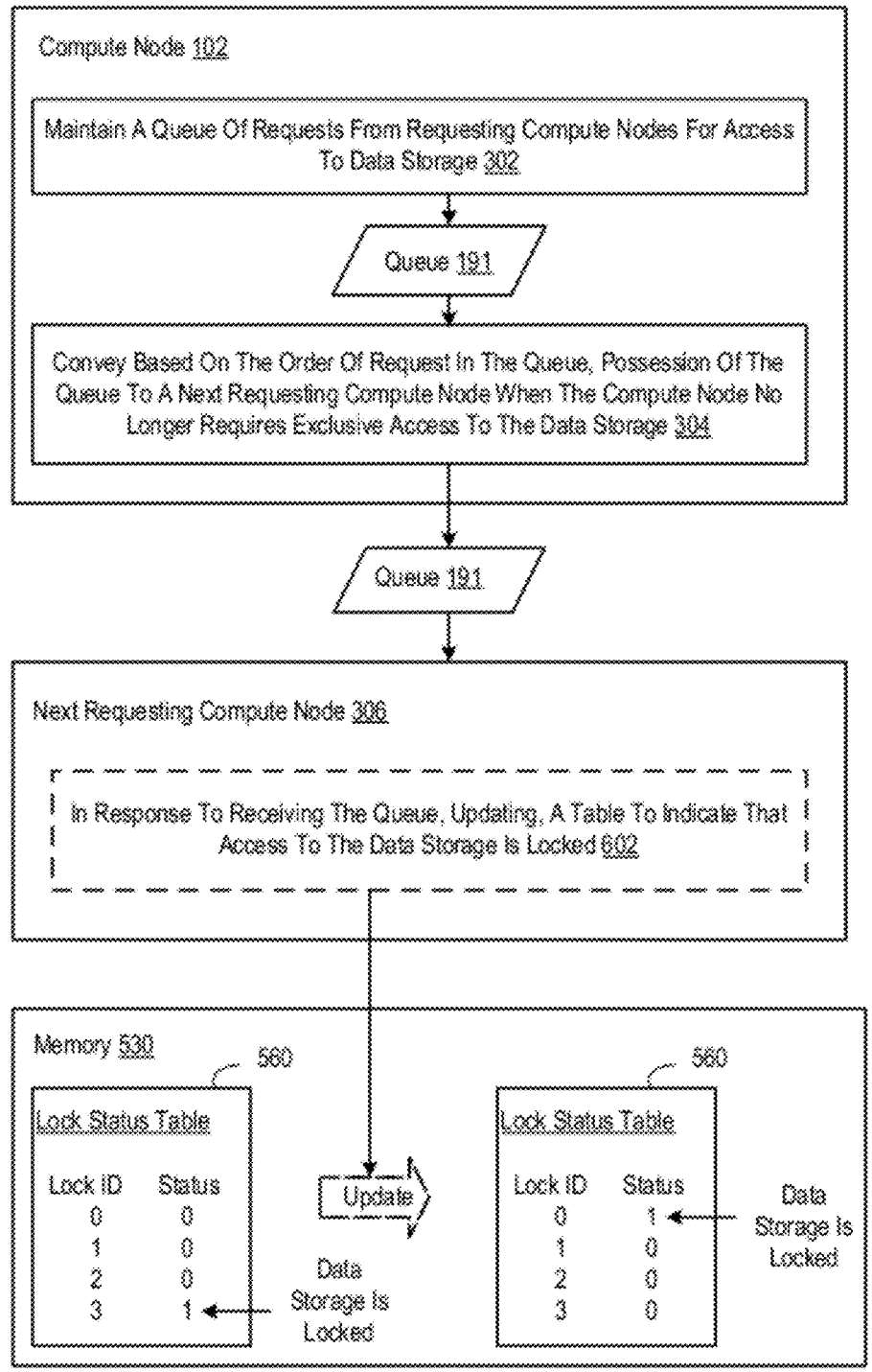
FIG. 6 sets forth a flow chart illustrating another example of a method for locking access to data storage shared by a plurality of compute nodes according to embodiments of the present invention.

For further explanation, FIG. 6 sets forth a flow chart illustrating a further example of a method for locking access to data storage shared by a plurality of compute nodes according to embodiments of the present invention. The method of FIG. 6 includes the following elements of the method of FIG. 3: maintaining (302), by a compute node (102), a queue (191) of requests (310, 312) from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying (304), based on the order of requests in the queue (191), possession of the queue (191) from the compute node (102) to a next requesting compute node (306) when the compute node (102) no longer requires exclusive access to the data storage.

The elements of FIG. 6 that differ from the method of FIG. 3 are illustrated in FIG. 6 with a dashed line. More particularly, those elements include in response to receiving the queue (191), updating (602), by the next requesting compute node (306), the lock status table (560) to indicate that access to the data storage is locked. Updating (602) the lock status table (560) may be carried out by establishing communication with the memory (530); determining the parameter and identifier within the lock status table (560) that corresponds with the requesting compute node (410); and changing the value of the determined identifier.

Figure 7:
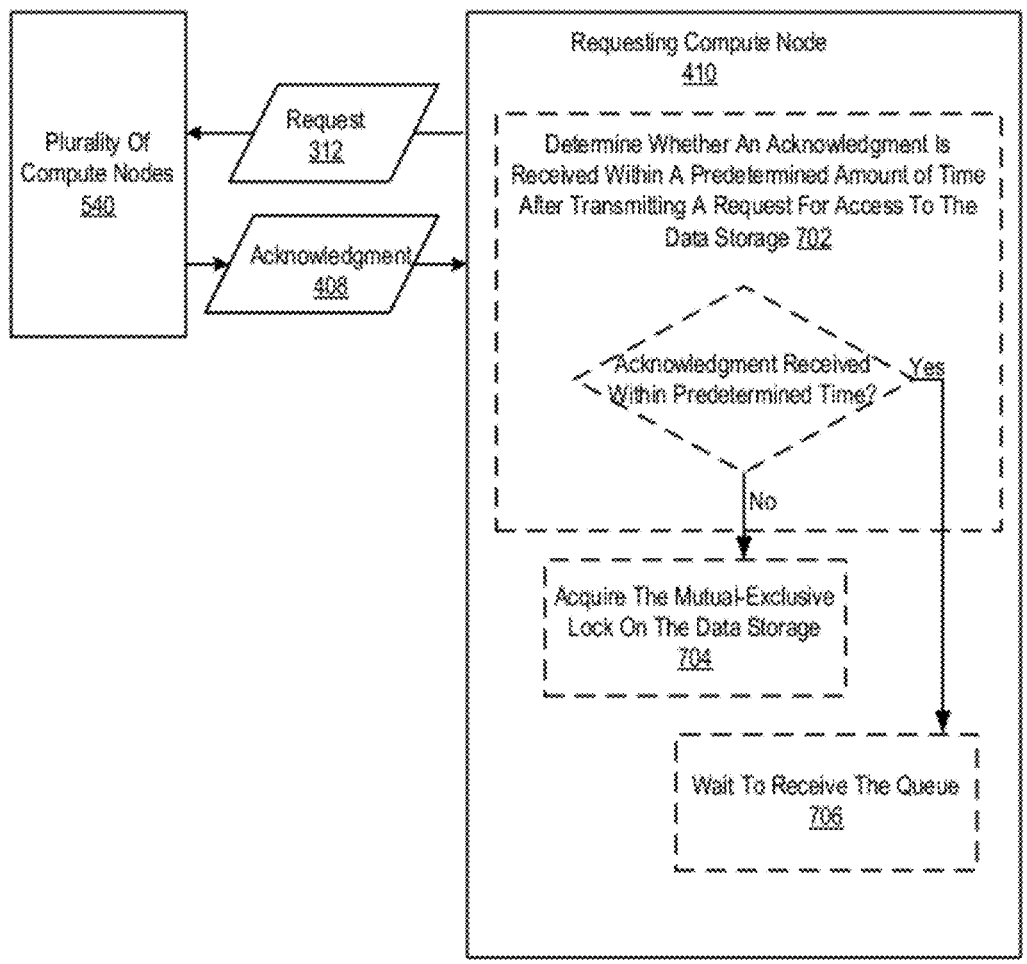
FIG. 7 sets forth a flow chart illustrating another example of a method for locking access to data storage shared by a plurality of compute nodes according to embodiments of the present invention.

For further explanation, FIG. 7 sets forth a flow chart illustrating a further example of a method for locking access to data storage shared by a plurality of compute nodes according to embodiments of the present invention. The method of FIG. 7 includes determining (702), by a requesting compute node (410), whether an acknowledgement (408) is received within a predetermined amount of time after transmitting a request (312) for access to the data storage. Determining (702) whether an acknowledgement (408) is received within a predetermined amount of time after transmitting a request (312) may be carried out by tracking the amount of time elapsed from transmitting a request (312) and determining if the elapsed time at any point exceeds a predetermined amount of time. The predetermined amount of time may be programmable by a user via an interface of the requesting compute node (410).

The method of FIG. 7 also includes if an acknowledgment (408) is not received within the predetermined amount of time, acquiring (704), by the requesting compute node (410), the mutual-exclusion lock on the data storage. Acquiring (704) the mutual-exclusion lock may be carried out by updating a lock status table to indicate that the requesting compute node (410) now has the mutual-exclusion lock on the data storage.

The method of FIG. 7 includes if an acknowledgment (408) is received within the predetermined amount of time, waiting (706) to receive the queue before acquiring (704) the mutual-exclusion lock on the data storage. Waiting (706) to receive the queue may be carried out by tracking the amount of time elapsed from receiving the acknowledgment (408); comparing the elapsed time with a predetermined threshold; and transmitting a new request (312) to the plurality of compute nodes (540) if the threshold is exceeded.

Figure 8:
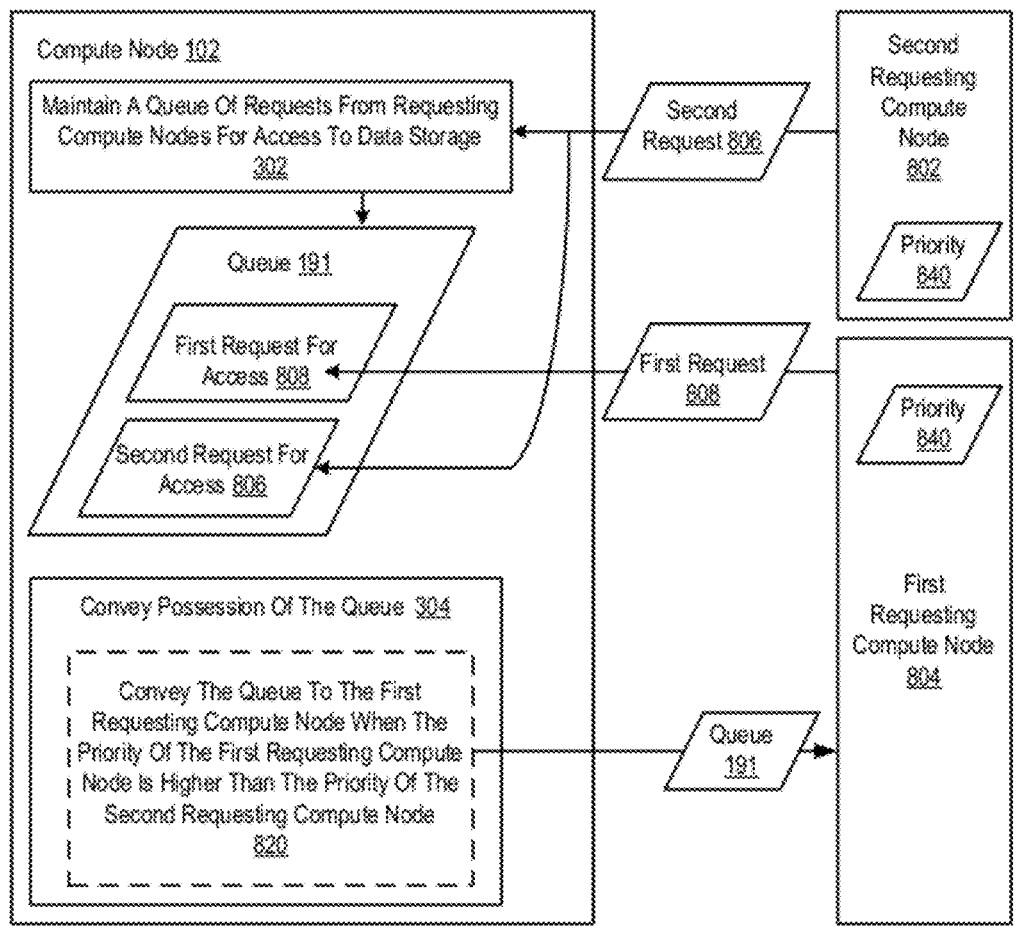
FIG. 8 sets forth a flow chart illustrating a further example of a method for locking access to data storage shared by a plurality of compute nodes according to embodiments of the present invention.

For further explanation, FIG. 8 sets forth a flow chart illustrating a further example of a method for locking access to data storage shared by a plurality of compute nodes according to embodiments of the present invention. The method of FIG. 8 includes the following elements of the method of FIG. 3: maintaining (302), by a compute node (102), a queue (191) of requests (310, 312) from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying (304), based on the order of requests in the queue (191), possession of the queue (191) from the compute node (102) to a next requesting compute node (306) when the compute node (102) no longer requires exclusive access to the data storage.

The elements of FIG. 8 that differ from the method of FIG. 3 are illustrated in FIG. 8 with a dashed line. More particularly, those elements include: in response to the compute node (102) receiving at the same time, a first request (808) for access to the queue (191) from a first requesting compute node (804) and a second request (806) for access from a second requesting compute node (802), conveying (820) the queue (191) to the first requesting compute node (804) when the priority (830) of the first requesting compute node (804) is higher than the priority (840) of the second requesting compute node (802).

In the method of FIG. 8, conveying (304), based on the order of requests in the queue (191), possession of the queue (191) from the compute node (102) to a next requesting compute node (306) when the compute node (102) no longer requires exclusive access to the data storage includes in response to the compute node (102) receiving at the same time, a first request (808) for access to the queue (191) from a first requesting compute node (804) and a second request (806) for access from a second requesting compute node (802), conveying (820) the queue (191) to the first requesting compute node (804) when the first requesting compute node (804) has a higher priority than the second requesting compute node (802). Conveying (820) the queue (191) to the first requesting compute node (804) when the priority (830) of the first requesting compute node (804) is higher than the priority (840) of the second requesting compute node (802) may be carried out by compute node receiving the priorities (830, 840) of the first requesting compute node (804) and the second requesting compute node (802); storing the priorities (830, 840) at the compute node (102); assigning a timestamp to the first request (808) and the second request (806); comparing the timestamps to determine which of the first request (808) and the second request (806) was received first; comparing the priorities (830, 840) to determine which requesting compute node (802, 804) has a higher priority; and when the timestamps of the first request (808) and the second request (806) are the substantially the same, placing the request associated with the requesting node that has the higher priority.

Figure 9:
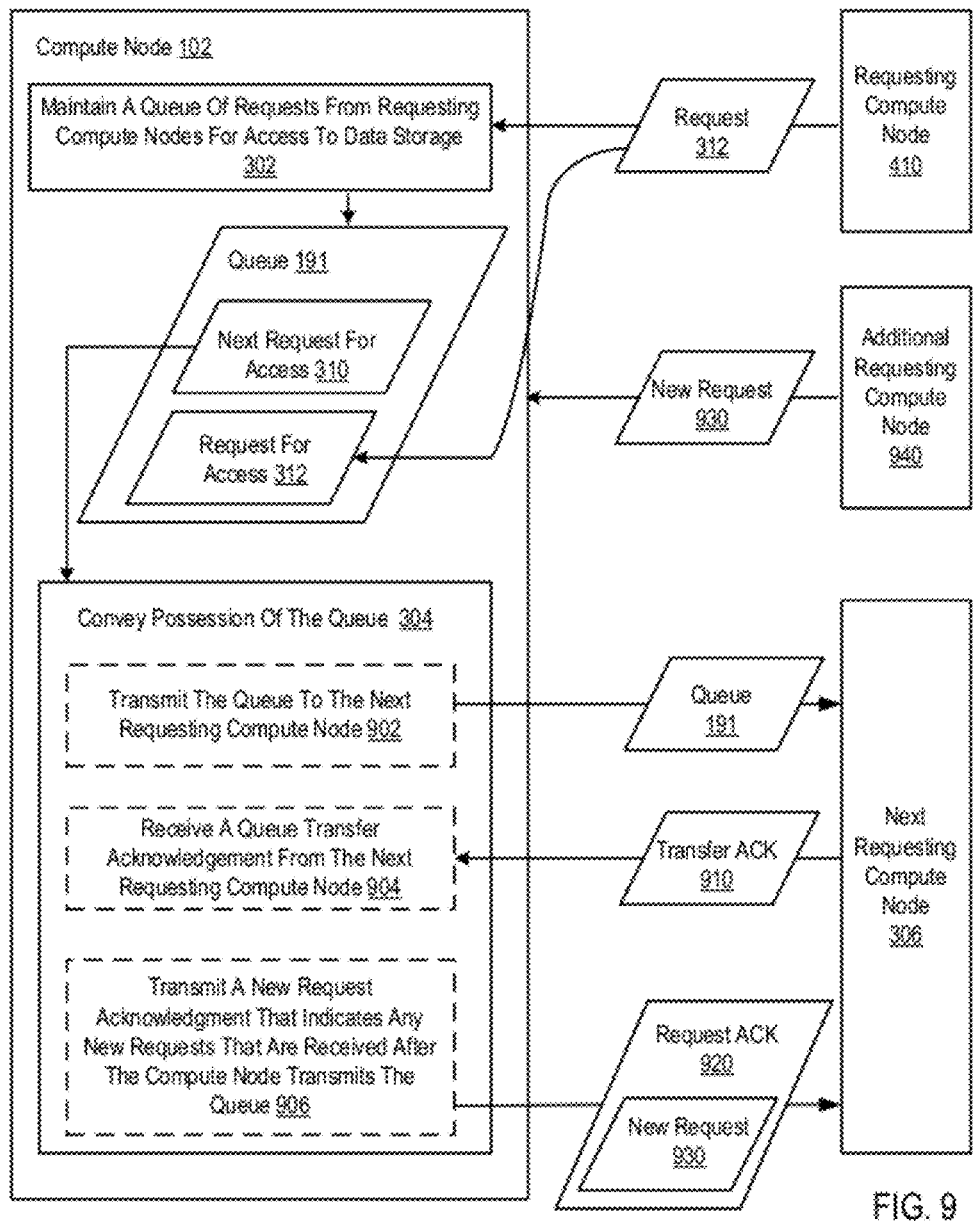
FIG. 9 sets forth a flow chart illustrating a further example of a method for locking access to data storage shared by a plurality of compute nodes according to embodiments of the present invention.

For further explanation, FIG. 9 sets forth a flow chart illustrating a further example of a method for locking access to data storage shared by a plurality of compute nodes according to embodiments of the present invention. The method of FIG. 9 includes the following elements of the method of FIG. 3: maintaining (302), by a compute node (102), a queue (191) of requests (310, 312) from requesting compute nodes of the plurality of compute nodes for access to the data storage, wherein possession of the queue represents possession of a mutual-exclusion lock on the data storage, the mutual-exclusion lock indicating exclusive permission for access to the data storage; and conveying (304), based on the order of requests in the queue (191), possession of the queue (191) from the compute node (102) to a next requesting compute node (306) when the compute node (102) no longer requires exclusive access to the data storage.

The elements of FIG. 9 that differ from the method of FIG. 3 are illustrated in FIG. 9 with a dashed line. More particularly, those elements include: transmitting (902) the queue (191) to the next requesting compute node (306); receiving (904) a queue transfer acknowledgement (910) from the next requesting compute node (306); and transmitting (906) a new request acknowledgement (920) that indicates any new requests (930) that are received by the compute node (102) after the compute node (102) transmits (902) the queue (191) to the next requesting compute node (306).

In the method of FIG. 9, conveying (304), based on the order of requests in the queue (191), possession of the queue (191) from the compute node (102) to a next requesting compute node (306) when the compute node (102) no longer requires exclusive access to the data storage includes transmitting (902) the queue (191) to the next requesting compute node (306). Transmitting (902) the queue (191) to the next requesting compute node (306) may be carried out by propagating the queue (191) to the next requesting compute node (306).

In the method of FIG. 9, conveying (304), based on the order of requests in the queue (191), possession of the queue (191) from the compute node (102) to a next requesting compute node (306) when the compute node (102) no longer requires exclusive access to the data storage includes receiving (904) a queue transfer acknowledgement (910) from the next requesting compute node (306). Receiving (904) a queue transfer acknowledgement (910) from the next requesting compute node (306) may be carried out by establishing communication between the compute node (102) and the next requesting compute node (306) and receiving the transfer acknowledgement (910) after transmitting the queue (191).

In the method of FIG. 9, conveying (304), based on the order of requests in the queue (191), possession of the queue (191) from the compute node (102) to a next requesting compute node (306) when the compute node (102) no longer requires exclusive access to the data storage includes transmitting (906) a new request acknowledgement (920) that indicates any new requests (930) that are received by the compute node (102) after the compute node (102) transmits (902) the queue (191) to the next requesting compute node (306). Transmitting (906) a new request acknowledgement (920) that indicates any new requests (930) that are received by the compute node (102) after the compute node (102) transmits (902) the queue (191) to the next requesting compute node (306) may be carried out by receiving the new request (930) from an additional requesting compute node (940) after transmitting the queue (191); storing the new request (930) at the compute node (102); and placing data from the new request (930) into the request acknowledgement (920). By transmitting the request acknowledgement (920) to the next requesting compute node (306) after transmitting the queue (191), any new requests (930) that are transmitted by additional requesting compute node (940) during the transmission of the queue (191) will be transferred to the next requesting compute node (306) for storage within the queue (191).

In an alternative embodiment, when the compute node (102) no longer requires exclusive access to the data storage (110), the compute node (102) may release a broadcast message to the plurality of compute nodes in the cluster indicating that the lock is released. The compute node (102) may wait to receive an acknowledgement from each of the compute nodes of the plurality of compute nodes. In this alternative embodiment, the requesting compute nodes do not transmit requests for access to the data storage (110) during the conveying of the queue (191). When the queue (191) has be conveyed to the next requesting compute node (306), the compute node (102) transmits another broadcast message to indicate that the lock is available for requests. In this alternative embodiment, every node maintains a node ID status table so only one node shall have the queue and will allow additional requests to be added to the queue (191).

Example embodiments of the present invention are described largely in the context of a fully functional computer system for locking access to data storage shared by a plurality of compute nodes. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for locking access to data storage shared by a plurality of compute nodes, the method comprising:
   maintaining, by a compute node, a queue of requests from requesting compute nodes of the plurality of compute nodes for access to the data storage, wherein possession of the queue represents possession of a mutual-exclusion lock on the data storage, the mutual-exclusion lock indicating exclusive permission for access to the data storage; and
   conveying, based on the order of requests in the queue, possession of the queue from the compute node to a next requesting compute node when the compute node no longer requires exclusive access to the data storage.

2. The method of claim 1, further comprising:
   receiving, by the compute node from a requesting compute node, a request for access to the data storage;
   in response to receiving the request for access to the data storage, transmitting, by the compute node, an acknowledgment indicating that the compute node has the mutual-exclusion lock on the data storage.

3. The method of claim 2, wherein the requesting compute node transmits the request for access to the plurality of compute nodes and only the compute node with the mutual-exclusion lock transmits the acknowledgment to the requesting compute node.

4. The method of claim 1, further comprising:
   determining, by a requesting compute node, whether access to the data storage is locked by examining a lock status table that is stored in memory that is accessible by each of the nodes;
   in response to determining that the data storage is not locked, acquiring, by the requesting compute node, the mutual-exclusion lock on the data storage by updating the lock status table to indicate that access to the data storage is locked; and
   in response to determining that the data storage is locked, transmitting from the requesting compute node to the plurality of compute nodes, a request for access to the data storage.

5. The method of claim 4, further comprising in response to receiving the queue, updating, by the next requesting compute node, the lock status table to indicate that access to the data storage is locked.

6. The method of claim 1, further comprising:
   determining, by a requesting compute node, whether an acknowledgement is received within a predetermined amount of time after transmitting a request for access to the data storage; and
   if an acknowledgment is not received within the predetermined amount of time, acquiring, by the requesting compute node, the mutual-exclusion lock on the data storage.

7. The method of claim 1, wherein the request queue is stored at the compute node that has the mutual-exclusion lock on the data storage.

8. The method of claim 1, wherein conveying, based on the order of requests in the queue, possession of the queue from the compute node to a next requesting compute node when the compute node no longer requires exclusive access to the data storage is further based on a priority of the plurality of compute nodes;

wherein conveying, based on the order of requests in the queue and the priority of the plurality of compute nodes, possession of the queue from the compute node to a next requesting compute node when the compute node no longer requires exclusive access to the data storage includes in response to the compute node receiving at the same time, a first request for access to the queue from a first requesting compute node and a second request for access from a second requesting compute node, conveying the queue to the first requesting compute node when the priority of the first requesting compute node is higher than the priority of the second requesting compute node.

9. The method of claim 1, wherein conveying possession of the queue from the compute node to a next requesting compute node when the compute node no longer requires exclusive access to the data storage includes:
   transmitting the queue to the next requesting compute node;
   receiving a queue transfer acknowledgement from the next requesting compute node; and
   transmitting a new request acknowledgement that indicates any new requests that are received by the compute node after the compute node transmits the queue to the next requesting compute node.

10. An apparatus for prioritizing control of access to data storage, the apparatus comprising a plurality of compute nodes, each compute node comprising a computer processor and a computer readable memory operatively coupled to the computer processor, the computer readable memory having disposed within it computer program instructions that when executed by the computer processor, cause the apparatus to carry out the steps of:
   maintaining, by a compute node, a queue of requests from requesting compute nodes of the plurality of compute nodes for access to the data storage, wherein possession of the queue represents possession of a mutual-exclusion lock on the data storage, the mutual-exclusion lock indicating exclusive permission for access to the data storage; and
   conveying, by the compute node, based on the order of requests in the queue, possession of the queue from the compute node to a next requesting compute node when the compute node no longer requires exclusive access to the data storage.

11. The apparatus of claim 10, further comprising computer program instructions that when executed by the computer processor, cause the apparatus to carry out the steps of:
   receiving, by the compute node from a requesting compute node, a request for access to the data storage;
   in response to receiving the request for access to the data storage, transmitting, by the compute node, an acknowledgment indicating that the compute node has the mutual-exclusion lock on the data storage.

12. The apparatus of claim 11, wherein the requesting compute node transmits the request for access to the plurality of compute nodes and only the compute node with the mutual-exclusion lock transmits the acknowledgment to the requesting compute node.

13. The apparatus of claim 10, further comprising computer program instructions that when executed by the computer processor, cause the apparatus to carry out the steps of:
   determining, by a requesting compute node, whether access to the data storage is locked by examining a lock status table that is stored in memory that is accessible by each of the nodes;
   in response to determining that the data storage is not locked, acquiring, by the requesting compute node, the mutual-exclusion lock on the data storage by updating the lock status table to indicate that access to the data storage is locked; and
   in response to determining that the data storage is locked, transmitting from the requesting compute node to the plurality of compute nodes, a request for access to the data storage.

14. The apparatus of claim 13, further comprising computer program instructions that when executed by the computer processor, cause the apparatus to carry out the steps of in response to receiving the queue, updating, by the next requesting compute node, the lock status table to indicate that access to the data storage is locked.

15. The apparatus of claim 10, further comprising computer program instructions that when executed by the computer processor, cause the apparatus to carry out the steps of:
   determining, by a requesting compute node, whether an acknowledgement is received within a predetermined amount of time after transmitting a request for access to the data storage; and
   if an acknowledgment is not received within the predetermined amount of time, acquiring, by the requesting compute node, the mutual-exclusion lock on the data storage.

16. A computer program product for locking access to data storage shared by a plurality of compute nodes, the computer program product comprising:
   a non-transitory, computer readable storage medium having computer readable program code embodied therewith, the computer readable program code comprising computer readable program code configured to:
   maintain, by a compute node, a queue of requests from requesting compute nodes of the plurality of compute nodes for access to the data storage, wherein possession of the queue represents possession of a mutual-exclusion lock on the data storage, the mutual-exclusion lock indicating exclusive permission for access to the data storage; and
   convey, based on the order of requests in the queue, possession of the queue from the compute node to a next requesting compute node when the compute node no longer requires exclusive access to the data storage.

17. The computer program product of claim 16, further comprising computer program code configured to:
   receive, by the compute node from a requesting compute node, a request for access to the data storage;
   in response to receiving the request for access to the data storage, transmit, by the compute node, an acknowledgment indicating that the compute node has the mutual-exclusion lock on the data storage.

18. The computer program product of claim 17, wherein the requesting compute node transmits the request for access to the plurality of compute nodes and only the compute node with the mutual-exclusion lock transmits the acknowledgment to the requesting compute node.

19. The computer program product of claim 16, further comprising computer program code configured to:
   determine, by a requesting compute node, whether access to the data storage is locked by examining a lock status table that is stored in memory that is accessible by each of the nodes;
   in response to determining that the data storage is not locked, acquire, by the requesting compute node, the mutual-exclusion lock on the data storage by updating the lock status table to indicate that access to the data storage is locked; and in response to determining that the data storage is locked, transmit from the requesting compute node to the plurality of compute nodes, a request for access to the data storage.

20. The computer program product of claim 19, further comprising computer program code configured to in response to receiving the queue, update, by the next requesting compute node, the lock status table to indicate that access to the data storage is locked.

\* \* \* \* \*